(12) United States Patent
Zhai (10) Patent No.: US 10,466,832 B2
(45) Date of Patent: Nov. 5, 2019

(54) TOUCH PANEL, TOUCH DISPLAY PANEL AND DISPLAY DEVICE

(71) Applicants: SHANGHAI TIANMA MICRO-ELECTRONICS CO., LTD., Shanghai (CN); TIANMA MICRO-ELECTRONICS CO., LTD., Shenzhen (CN)

(72) Inventor: Yingteng Zhai, Shanghai (CN)

(*) Notice: Subject to any disclaimer, the term of this patent is extended or adjusted under 35 U.S.C. 154(b) by 199 days.

(21) Appl. No.: 15/077,864

(22) Filed: Mar. 22, 2016

(65) Prior Publication Data

US 2016/0291784 A1 Oct. 6, 2016

(30) Foreign Application Priority Data

Apr. 1, 2015 (CN) .......................... 2015 1 0152738

(51) Int. Cl.
*G06F 3/041* (2006.01)
*G06F 3/044* (2006.01)
*G02F 1/1333* (2006.01)

(52) U.S. Cl.
CPC .......... *G06F 3/0416* (2013.01); *G06F 3/044* (2013.01); *G06F 3/0412* (2013.01); *G02F 1/13338* (2013.01)

(58) Field of Classification Search
CPC ...... G06F 3/0416; G06F 3/0412; G06F 3/044; G02F 1/13338
See application file for complete search history.

(56) References Cited

U.S. PATENT DOCUMENTS

| 5,852,426 A * | 12/1998 | Erhart ................. G09G 3/2011 |
| | | 345/96 |
| 2010/0194695 A1* | 8/2010 | Hotelling .............. G06F 3/0412 |
| | | 345/173 |
| 2010/0194698 A1* | 8/2010 | Hotelling .............. G06F 1/3218 |
| | | 345/173 |

(Continued)

FOREIGN PATENT DOCUMENTS

| CN | 103593083 A | 2/2014 |
| CN | 104240631 A | 12/2014 |
| CN | 104391600 A | 3/2015 |

OTHER PUBLICATIONS

The first Office Action in the corresponding Chinese application 201510152738.4, dated Mar. 23, 2017.

*Primary Examiner* — Patrick N Edouard
*Assistant Examiner* — Eboni N Giles
(74) *Attorney, Agent, or Firm* — Kilpatrick Townsend & Stockton, LLP (57) ABSTRACT

It is provided a touch panel including a substrate where a touch electrode layer and multiple touch lines are disposed on, and the touch panel further includes: a multipath gating circuit including multiple touch switches and at least one touch clock signal line, where each touch switch includes a control terminal, a signal input terminal and a signal output terminal, the signal output terminal of the touch switch is connected to a second terminal of a touch line corresponding to the touch switch, the signal input terminals of at least two of the touch switches are electronically connected to each other and are connected to a touch signal source, the control terminal of each of the touch switches is connected to the touch clock signal line corresponding to the touch switch.

6 Claims, 8 Drawing Sheets

(56) References Cited

U.S. PATENT DOCUMENTS

| | | | |
|---|---|---|---|
| 2013/0063404 A1* | 3/2013 | Jamshidi Roudbari | ............ G06F 3/044 345/204 |
| 2014/0049486 A1 | 2/2014 | Kim et al. | |
| 2014/0132557 A1 | 5/2014 | Saitou et al. | |
| 2015/0116263 A1* | 4/2015 | Kim | ............ G06F 3/044 345/174 |
| 2016/0259455 A1 | 9/2016 | Li et al. | |
| 2016/0328059 A1* | 11/2016 | Wang | ............ G06F 3/044 |

\* cited by examiner

TOUCH PANEL, TOUCH DISPLAY PANEL AND DISPLAY DEVICE

This application claims priority to Chinese Patent Application No. 201510152738.4, titled "TOUCH PANEL, TOUCH DISPLAY PANEL AND DISPLAY DEVICE", filed with the Chinese State Intellectual Property Office on Apr. 1, 2015, which is incorporated by reference in its entirety herein.

FIELD

The disclosure relates to the field of liquid crystal technology, and in particular to a touch panel, a touch display panel including the touch panel and a display device.

BACKGROUND

In the conventional art, a touch panel includes a touch electrode layer, and the touch electrode layer includes multiple touch electrodes insulated from each other. Each of the touch electrodes is connected to a touch line, and each of the touch lines is connected to a signal output line and a pin drawn out of a touch signal source. In this way, a touch detection signal output from the touch signal source can be applied to each of the touch lines.

In general, however, the touch panel includes a large number of touch electrodes. Because each of the touch electrodes is connected to a pin and a signal output line, there are many leads and pins at a region where the touch panel is connected to the signal source.

SUMMARY

In view of this, in order to reduce the number of the traces and the number of lead pins, it is provided a touch panel, a touch display panel including the touch panel and a display device according to the embodiments of the disclosure.

Following technical solutions are provided according to embodiments of the disclosure to achieve the above objects.

A touch panel includes a substrate, where a touch electrode layer and multiple touch lines are disposed on the substrate, the touch electrode layer includes multiple touch electrodes insulated from each other, each touch electrode is connected to a first terminal of the touch line corresponding to the touch electrode, and the touch panel further includes:

a multipath gating circuit including multiple touch switches and at least one touch clock signal line;

where each of the touch switches includes a control terminal, a signal input terminal and a signal output terminal, where the signal output terminal of the touch switch is connected to a second terminal of the touch line corresponding to the touch switch, the signal input terminals of at least two of the touch switches are electronically connected to each other and are connected to a touch signal source, the control terminal of each of the touch switches is connected to the touch clock signal line corresponding to the touch switch.

A touch display panel includes a substrate, where a touch electrode layer and multiple touch lines are disposed on the substrate, the touch electrode layer includes multiple touch electrodes insulated from each other, each touch electrode is electronically connected to a first terminal of the touch line corresponding to the touch electrode, and the touch display panel further includes:

a multipath gating circuit including multiple touch switches and at least one touch clock signal line;

where each of the touch switches includes a control terminal, a signal input terminal and a signal output terminal, where the signal output terminal of the touch switch is connected to a second terminal of the touch line corresponding to the touch switch, the signal input terminals of at least two of the touch switches are electronically connected to each other and are connected to a touch signal source, the control terminal of each of the touch switches is connected to the touch clock signal line corresponding to the touch switch.

A display device includes the above touch display panel.

Compared with the conventional art, the embodiments of the disclosure have the following advantageous effect.

In the touch panel according to the embodiments of the disclosure, the second terminals of at least two of the touch lines are electronically connected to the multipath gating circuit. In this way, a touch signal output from the signal source may be transmitted to the multipath gating circuit through one signal output line and one lead pin, and the multipath gating circuit provides gate connection to a corresponding touch line, so that the touch signal is transmitted to the corresponding touch line. Compared with the conventional art, the touch panel according to the disclosure reduces at least one signal output line and at least one lead pin, thereby reducing the number of the leads and the number of lead pins.

BRIEF DESCRIPTION OF THE DRAWINGS

For clarity of the technical solutions of the disclosure, drawings for embodiments of the disclosure are briefly described below. Apparently, the drawings illustrate merely some embodiments of the disclosure. Those skilled in the art may obtain some other drawings without any creative work.

DETAILED DESCRIPTION OF THE EMBODIMENTS

To make the object, technical solutions and advantageous effect of the disclosure more clear and complete, the embodiment of the disclosure will be described in detail in conjunction with the drawings hereinafter.

Firstly, a structure of a touch panel according to an embodiment of the disclosure is described.

Figure 1:
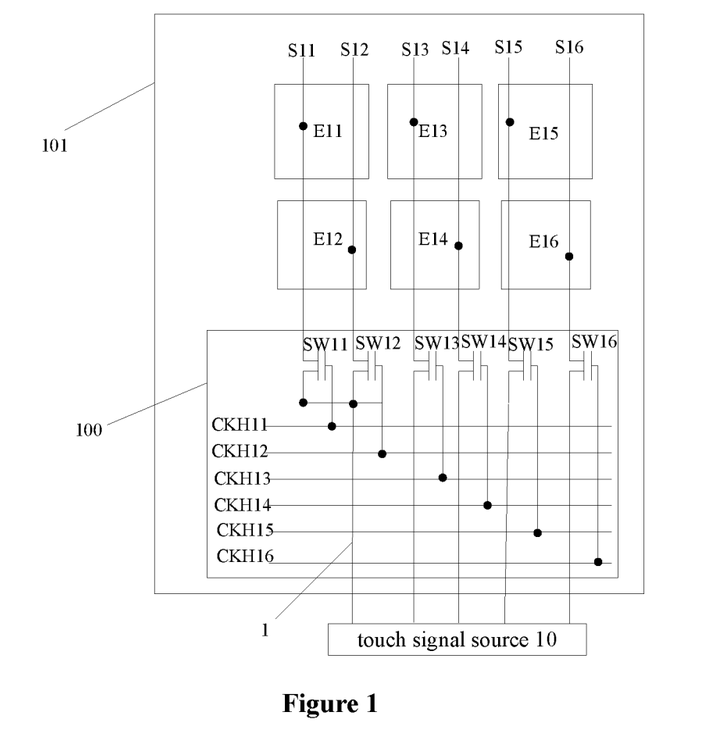
FIG. 1 is a schematic diagram of a structure of a touch panel according to an embodiment of the disclosure.

FIG. 1 is a schematic diagram of a structure of a touch panel according to the embodiment of the disclosure. As shown in FIG. 1, the touch panel includes a substrate 101, where a touch electrode layer and six touch lines S11 to S16 are disposed on the substrate 101. The touch electrode layer includes six touch electrodes E11 to E16 insulated from each other, where each of the touch electrodes is connected to a first terminal of a touch line corresponding to the touch electrode. In particular, the touch electrode E11 is connected to the touch line S11, the touch electrode E12 is connected to the touch line S12, the touch electrode E13 is connected to the touch line S13, the touch electrode E14 is connected to the touch line S14, the touch electrode E15 is connected to the touch line S15, and the touch electrode E16 is connected to the touch line S16.

The touch panel further includes a multipath gating circuit 100. The multipath gating circuit 100 includes:

six touch switches SW11 to SW16 and six touch clock signal lines CKH11 to CKH16.

Each of the touch switches includes a control terminal, a signal input terminal and a signal output terminal. The signal output terminal of the touch switch is connected to a second terminal of the touch line corresponding to the touch switch. The signal input terminals of the touch switches SW11 and SW12 are electronically connected to each other and are connected to a touch signal source 10 through a signal output line 1. The signal input terminals of the touch switches SW13 to SW16 are respectively connected to the touch signal source 10 through the signal output line 1.

The control terminal of each of the touch switches is connected to a touch clock signal line corresponding to the touch switch. In particular, the control terminal of the touch switch SW11 is connected to the touch clock signal line CKH11, the control terminal of the touch switch SW12 is connected to the touch clock signal line CKH12, the control terminal of the touch switch SW13 is connected to the touch clock signal line CKH13, the control terminal of the touch switch SW14 is connected to the touch clock signal line CKH14, the control terminal of the touch switch SW15 is connected to the touch clock signal line CKH15, and the control terminal of the touch switch SW16 is connected to the touch clock signal line CKH16.

In the touch panel as shown in FIG. 1, because the signal output terminal of the touch switch is connected to the second terminal of the touch line, the signal input terminals of the touch switches SW11 and SW12 being electronically connected to each other and being connected to the touch signal source 10 is equivalent to that the touch lines S11 and S12 are in electrical gate connection with each other and are connected to the touch signal source 10. In this way, the touch signal source 10 may output a touch signal to each of the touch lines through one touch signal output line 1 and one lead pin. Compared with the touch panel in the conventional art where each of the touch lines is connected to a lead and a lead pin, the touch panel according to the embodiment of the disclosure needs less leads and less lead pins.

As an embodiment of the above touch panel, the touch switch may be a CMOS tube or a thin film transistor.

It should be noted that, as an example, the touch panel shown in FIG. 1 merely illustrates six touch electrodes. In practice, the number of the touch electrodes on the touch panel is far more than six. The number of the touch electrodes on the touch panel is not limited herein.

In addition, in the touch panel as shown in FIG. 1, the signal input terminals of merely two of the touch switches are electronically connected to each other and are connected to the touch signal source. In practice, as an extension of the embodiment of the disclosure, the signal input terminals of three, four, or more of the touch switches may be electronically connected together.

Figure 2:
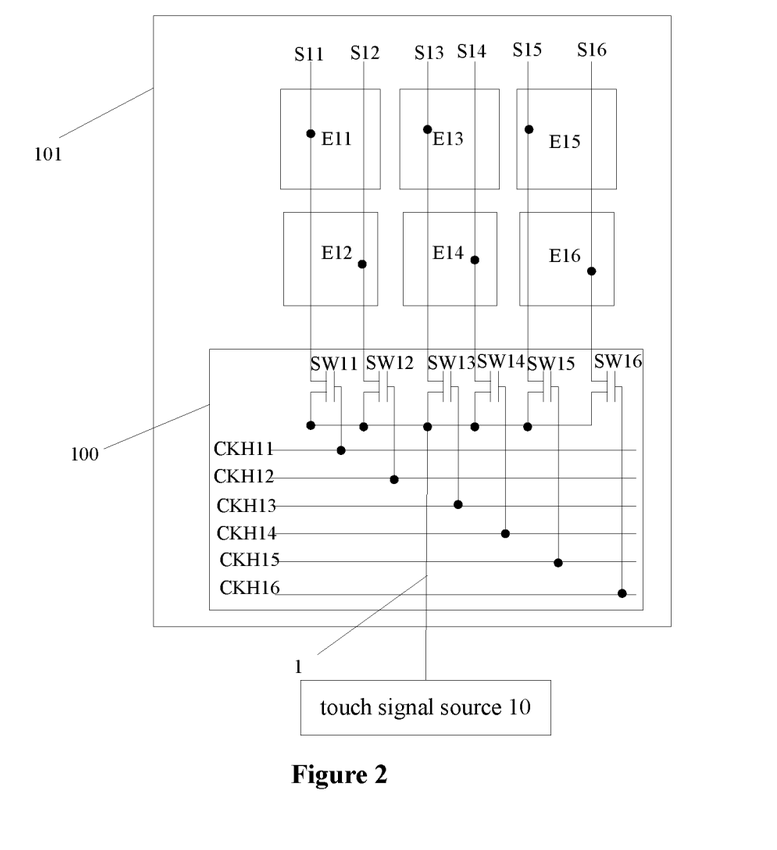
FIG. 2 is a schematic diagram of another structure of the touch panel according to an embodiment of the disclosure.

In order to reduce the number of the leads and the number of the lead pins as far as possible, the signal input terminals of all the touch switches are electronically connected to each other and are connected to the touch signal source. The schematic structural diagram of the above touch panel is shown in FIG. 2. In FIG. 2, the signal input terminals of all the touch switches SW11 to SW16 are electronically connected to each other and are connected to the touch signal source 10.

In practice, as an extension of the embodiment of the disclosure, the effect of reducing the number of the leads and the number of the lead pins may be achieved as long as at least two of the touch lines on the touch panel are electronically connected to the multipath gating circuit. The number of the touch lines electronically connected to the multipath gating circuit is not limited herein.

It should be noted that the touch panels as shown in FIG. 1 and FIG. 2 may be touch panels where the touch electrodes are driven simultaneously or the touch panels where the touch electrodes are driven in a time-sharing manner. In the case that the touch panel is a touch panel in which the touch electrodes are driven simultaneously, the control terminals of different touch switches are turned on at the same time, and the control terminals of the different touch switches may be connected to a same touch clock signal line or may be respectively connected to different touch clock signal lines. When the touch electrodes are driven, the touch clock signal controls all the touch switches to be turned on. In the case that the touch panel is the touch panel where the touch electrodes are driven in a time-sharing manner, control terminals of different touch switches are respectively connected to different touch clock signal lines. In the case that the touch electrodes on the touch panel are driven in a time-sharing manner, the touch clock signal controls the touch switches to be turned on and turned off at different moments.

Figure 3:
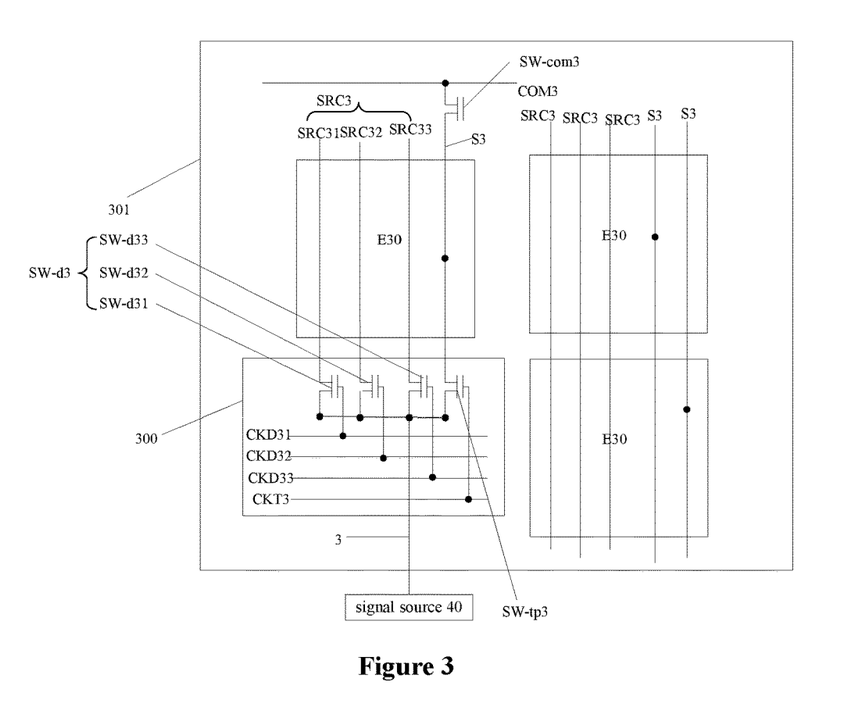
FIG. 3 is a schematic diagram of a first structure of a touch display panel according to an embodiment of the disclosure.

It is also provided a touch display panel according to an embodiment of the disclosure. In the touch display panel, in order to reduce the number of the signal output lines and the number of the lead pins, a data line and a touch line are in gate connection with each other and are connected to a signal source. A structure of the touch display panel is shown in FIG. 3. FIG. 3 is a schematic diagram of a first structure of the touch display panel according to the embodiment of the disclosure.

As shown in FIG. 3, the touch display panel includes a substrate 301, where a touch electrode layer and multiple touch lines S3 are disposed on the substrate 301. The touch electrode layer includes multiple touch electrodes E30 insulated from each other, and each touch electrode E30 is electronically connected to a first terminal of a touch line S3 corresponding to the touch electrode E30.

The touch display panel further includes multiple data lines SRC3, a common electrode line COM3, a common electrode switch SW-com3. In addition, the touch display panel further includes at least one multipath gating circuit 300.

The multipath gating circuit 300 includes:

three first switches SW-d31 to SW-d33, a touch switch SW-tp3, three first clock signal line CKD31 to CKD33 and a touch clock signal line CKT3. Each of the first switches SW-d3 includes a first control terminal, a first signal input terminal and a first signal output terminal. The touch switch SW-tp3 includes a control terminal, a signal input terminal and a signal output terminal.

The first signal output terminal of the first switch SW-d31 is connected to the data line SRC31, the first signal output terminal of the first switch SW-d32 is connected to the data line SRC32, and the first signal output terminal of the first switch SW-d33 is connected to the data line SRC33.

The common electrode switch SW-com3 is disposed between the common electrode line COM3 and the touch line S3.

The signal output terminal of the touch switch SW-tp3 is connected to a second terminal of the touch line S3.

The first signal input terminals of the first switches SW-d31 to SW-d33 are electronically connected to the signal input terminal of the touch switch SW-tp3, and are connected to the signal source 40 through the signal output line 3. The control terminal of the touch switch SW-tp3 is connected to the touch clock signal line CKT3. It should be noted that, the signal source 40 in the embodiment of the disclosure may output a display signal, as well as a touch detection signal, and the signal source 40 may output the display signal and the touch detection signal to the signal output line through the same lead pin.

The first control terminal of the first switch SW-d31 is electronically connected to the first clock signal line CKD31, the first control terminal of the first switch SW-d32 is electronically connected to the first clock signal line CKD32, and the first control terminal of the first switch SW-d33 is electronically connected to the first clock signal line CKD33.

When the touch display panel is in a display period, phases of display clock pulse signals input to the first clock signal lines CKD31 to CKD33 sequentially lag, controlling the first switches SW-d31 to SW-d33 to be sequentially turned on, and controlling the common electrode switch SW-com3 to be turned on. In this way, a common voltage signal is input to the touch electrode through the common electrode line COM3. At the same time, the touch switch is controlled to be turned off, thereby forming a circuit during the display period of the touch display panel.

A display signal $D_{signal}$ output from the signal source is applied to the first signal input terminals of the first switches SW-d31 to SW-d33 electronically connected to each other through the signal output line 3, and is applied to the signal input terminal of the touch switch SW-tp3. Then the display signal $D_{signal}$ is applied to a path which is selected to be connected to.

In the case that the first switch SW-d31 is turned on, the display signal $D_{signal}$ is input to the data line SRC31. In the case that the first switch SW-d32 is turned on, the display signal $D_{signal}$ is input to the data line SRC32. And in the case that the first switch SW-d33 is turned on, the display signal $D_{signal}$ is input to the data line SRC33.

When the touch display panel is in a touch detection period, the first switches SW-d31 to SW-d33 and the common electrode switch SW-com3 are controlled to be turned off, and the touch switch SW-tp3 is controlled to be turned on, thereby forming a circuit during the touch detection period of the touch display panel.

A touch detection signal $T_{signal}$ output from the signal source is transmitted through the signal output line 3 to the first signal input terminals of the first switches SW-d31 to SW-d33 electronically connected to each other, and is transmitted to the signal input terminal of the touch switch SW-tp3. Because the first switches SW-d31 to SW-d33 and the common electrode switch SW-com3 are turned off and the touch switch SW-tp3 is turned on, the touch detection signal $T_{signal}$ can be transmitted to the touch line through the touch switch SW-tp3, and thereby is transmitted to the touch electrode. In this way, a touch detection may be performed on the touch display panel.

It should be noted that, the signal source 40 in the embodiment of the disclosure may provide different signals in a time-sharing manner. When the touch display panel is in the display period, the signal source 40 is configured to provide the display signal $D_{signal}$. When the touch display panel is in the touch detection period, the signal source 40 is configured to provide the touch detection signal $T_{signal}$.

Figure 4:
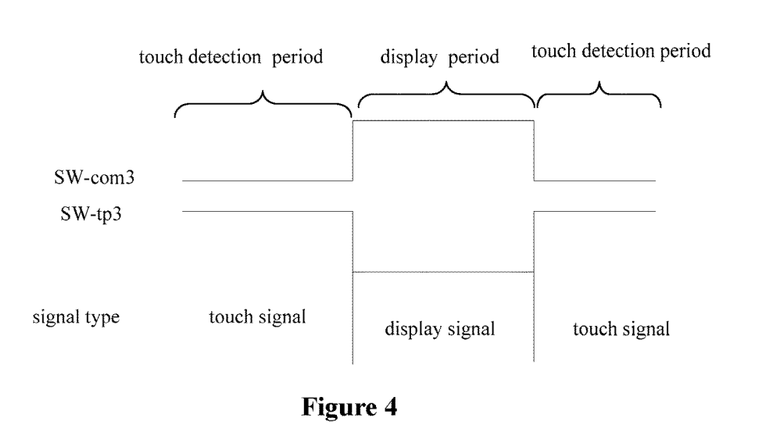
FIG. 4 is a schematic diagram of a correspondence between a timing of various types of signals outputted from signal source when a common electrode switch and a touch switch are turned on or off.

FIG. 4 shows a correspondence between a moment of turning on/off the common electrode switch SW-com3 and the touch switch SW-tp3 and a moment of outputting different types of signals by the signal source 40. As can be seen from FIG. 4, in the case that the common electrode switch SW-com3 is on and the touch switch SW-tp3 is off, the signal source 40 outputs a display signal for display. In the case that the common electrode switch SW-com3 is off and the touch switch SW-tp3 is on, the signal source 40 outputs a touch detection signal for touch detection.

In addition, in the touch display panel according to the embodiment of the disclosure, the common electrode may be reused as the touch electrode. Hence, the display and the touch detection may be driven in a time-sharing manner. The phases of the clock pulse signals input to the various first clock signal lines and the phase of the clock pulse signal input to the touch clock signal line are controlled to sequentially lag, to control the multiple first switches and the touch switch to be sequentially turned on, thereby achieving the effect that the display and the touch detection are driven in a time-sharing manner.

Different signals output from the signal source 40 may be transmitted to a corresponding data line or touch line through the multipath gating circuit 300 as shown in FIG. 3. Lead pins respectively corresponding to conventional data lines and touch lines can be integrated into one lead pin by the multipath gating circuit 300 according to the embodiment of the disclosure, and corresponding signal output lines 3 can be integrated into one signal output line 3. Hence, the multipath gating circuit 300 according to the embodiment of the disclosure reduces the number of the lead pins and the number of the signal output lines 3.

It should be noted that the touch display panel according to the embodiment of the disclosure includes at least one multipath gating circuit 300 as shown in FIG. 3. Preferably, in order to reduce the number of the lead pins and the number of the signal output lines 3, each of the touch electrodes in the touch display panel corresponds to a multipath gating circuit. In this way, the number of the multipath gating circuits and the number of the touch electrodes in the touch display panel are the same. In the case that the touch display panel includes multiple multipath gating circuits, the multipath gating circuits are in parallel connect.

It should be noted that the multipath gating circuit 300 shown in FIG. 3 is illustrates a case that the touch display panel includes pixel units of three colors. As a particular embodiment of the disclosure, in the case that the pixel units in the touch display panel include a red pixel unit R, a green pixel unit G and a blue pixel unit B, the data lines SRC31 to SRC33 may transmit data display signals for the red pixel unit R, the green pixel unit G and the blue pixel unit B in the touch display panel, respectively. In the case that the touch display panel further includes a pixel unit of another color, the number of the data lines SRC3 may be another value. In particular, the number of data lines in a multipath gating circuit is relevant to the number of colors of the pixel units.

In a particular embodiment of the present disclosure, the first switch, the touch switch and/or the common electrode switch may be CMOS tubes.

In another specific embodiment of the present disclosure, the first switch, the touch switch and/or the common electrode switch may be thin film transistors.

The described above is the first structure of the touch display panel according to an embodiment of the disclosure.

Figure 5:
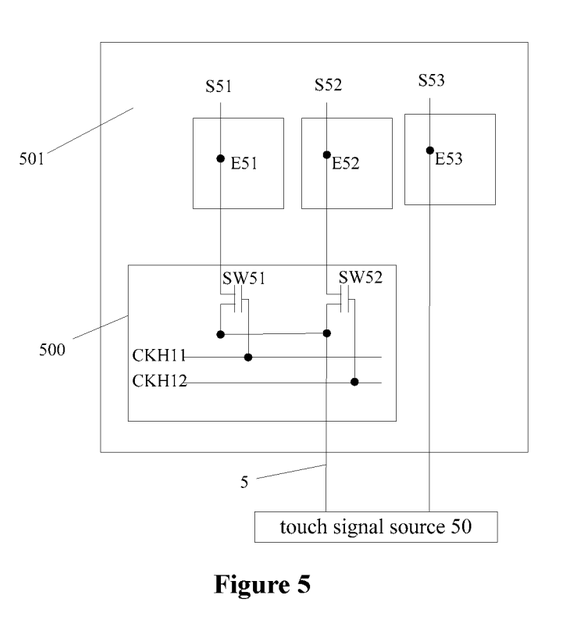
FIG. 5 is a schematic diagram of a second structure of the touch display panel according to an embodiment of the disclosure.

In addition, a second structure of the touch display panel is also provided in the disclosure, as is shown in FIG. 5.

As shown in FIG. 5, the second structure of the touch display panel according to the disclosure is as follows.

The touch display panel includes a substrate 501, where a touch electrode layer and three touch lines S51 to S53 are disposed on the substrate 501. The touch electrode layer includes three touch electrodes E51 to E53 insulated from each other, each of the touch electrodes is electronically connected to a first terminal of a touch line corresponding to the touch electrode. The touch electrode E51 is connected to the first terminal of the touch line S51, the touch electrode E52 is connected to the first terminal of the touch line S52, and the touch electrode E53 is connected to the first terminal of the touch line S53.

The touch display panel further includes a multipath gating circuit 500. The multipath gating circuit 500 includes:

two touch switches SW51 and SW52, and two touch clock signal lines CKT51 and CKT52.

Each of the touch switches includes a control terminal, a signal input terminal and a signal output terminal. The signal output terminal of the touch switch is connected to a second terminal of a touch line corresponding to the touch switch. The signal input terminals of the touch switches SW51 and SW52 are electronically connected to each other and are connected to a touch signal source 50. The control terminal of each of the touch switches is connected to the touch clock signal line CKT51 or CKT52 corresponding to the touch switch.

In the touch display panel shown in FIG. 5, because the signal output terminal of the touch switch is connected to the second terminal of the touch line, the signal input terminals of the touch switches SW51 and SW52 being electronically connected to each other and being connected to the touch signal source 50 is equivalent to that the touch lines S51 and S52 are electronically connected to each other and are connected to the touch signal source 50. In this way, the touch signal source 50 may output the touch signal to all the touch lines through one touch signal output line 5 and one lead pin. Compared with the touch display panel in the conventional art where each of the touch lines needs a lead and a lead pin, the touch display panel according to the embodiment of the disclosure reduces the number of the leads and the number of lead pins.

It should be noted that, as an example, the touch display panel shown in FIG. 5 illustrates only two touch electrodes. In practice, the number of the touch electrodes on the touch display panel is far more than two. The number of the touch electrodes on the touch display panel is not limited herein.

Further, in the case that the touch display panel includes multiple touch switches, signal input terminals of all the touch switches may be electronically connected to each other and are connected to the touch signal source. Or signal input terminals of only a few of the touch switches are electronically connected to each other and are connected to the touch signal source.

The above described is the second structure of the touch display panel according to an embodiment of the disclosure.

In addition, the touch display panel further includes multiple data lines for inputting the display signal from the signal source. A signal output line and a lead pin is needed between each data line and the signal source. In order to reduce the number of the signal output lines and the number of the lead pins between the data lines and the signal source, the data lines may be electronically connected to a multipath gating circuit, which is described in detail in a third structure of the touch display panel according to an embodiment of the disclosure.

Figure 6:
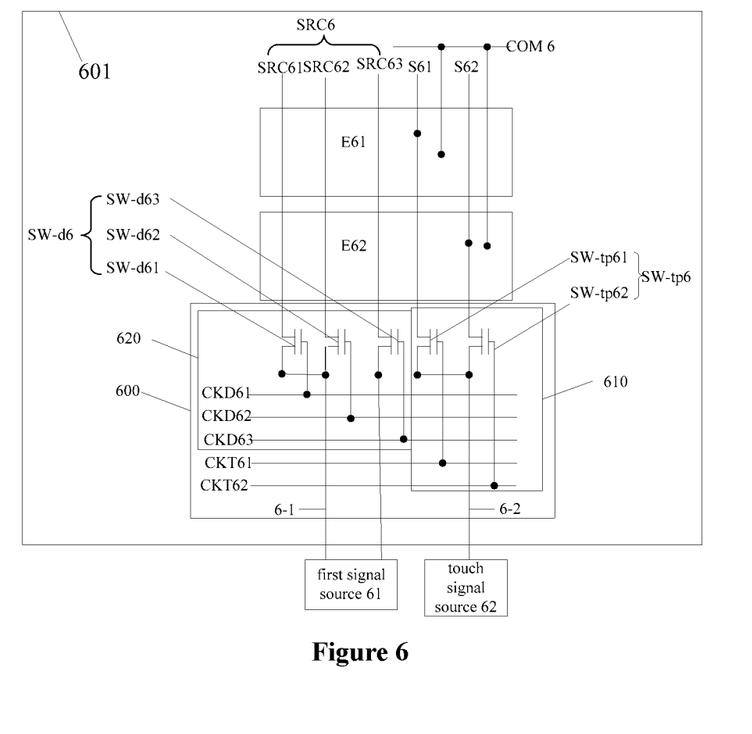
FIG. 6 is a schematic diagram of a third structure of the touch display panel according to an embodiment of the disclosure.

FIG. 6 is a schematic diagram of the third structure of the touch display panel according to the embodiment of the disclosure. As shown in FIG. 6, the touch display panel includes a substrate 601, where a touch electrode layer and two touch lines S61 and S62 are disposed on the substrate 601. The touch electrode layer includes two touch electrodes E61 and E62 insulated from each other, and each of the touch electrodes is electronically connected to a first terminal of one touch line corresponding to the touch electrode. The touch electrode E61 is connected to the touch line S61, the touch electrode E62 is connected to the touch line S62. The touch display panel shown in FIG. 6 further includes a common electrode line COM6 and multiple data lines SRC6. The common electrode line COM6 is connected to each of the touch electrodes for providing a common voltage signal to each of the touch electrodes.

In addition, the touch display panel further includes a multipath gating circuit 600. The multipath gating circuit 600 includes a first multipath gating circuit 610 and a second multipath gating circuit 620. The first multipath gating circuit 610 includes:

two touch switches SW61 and SW62, and two touch clock signal lines CKT61 and CKT62.

Each of the touch switches includes a control terminal, a signal input terminal and a signal output terminal. The signal output terminal of the touch switch is connected to a second terminal of the touch line corresponding to the touch switch. The signal input terminals of the touch switches SW61 and SW62 are electronically connected to each other and are connected to a touch signal source 61. The control terminal of each of the touch switches is connected to the touch clock signal lines CKT61 or CKT62 corresponding to the touch switch.

The second multipath gating circuit 620 includes:

three first switches SW-d61 to SW-d63, and three first clock signal line CKD61 to CKD63.

Each of the first switches includes a first control terminal, a first signal input terminal and a first signal output terminal.

The first signal output terminal of the first switch SW-d61 is connected to the data line SRC61, the first signal output terminal of the first switch SW-d62 is connected to the data line SRC62, and the first signal output terminal of the first switch SW-d63 is connected to the data line SRC63.

The common electrode line COM3 is connected to the touch electrode E61 and the touch electrode E62.

The first signal input terminals of the first switches SW-d61 and SW-d62 are electronically connected to each other and are electronically connected to a first signal source 61 through a display signal output line 6-1. The first signal input terminal of the first switch SW-d63 is connected to the first signal source 61 through another display signal output line 6-1.

The first control terminal of the first switch SW-d61 is connected to the first clock signal line CKD61, the first control terminal of the first switch SW-d62 is connected to the first clock signal line CKD62, and the first control terminal of the first switch SW-d63 is connected to the first clock signal line CKD63.

When the touch display panel is in a display period, phases of display clock pulse signals input to the first clock signal lines CKD61 to CKD13 sequentially lag, controlling the first switches SW-d11 to SW-d13 to be sequentially turned on, and a common voltage signal is input to touch electrodes through the common electrode line COM6. At the same time, the touch switch is controlled to be turned off, thereby forming a circuit during the display period of the touch display panel.

A display signal $D_{signal}$ output from the first signal source 61 is transmitted through the display signal output line 6-1 to the first signal input terminals of the first switches SW-d61 to SW-d63 and is transmitted to the first signal input terminal of the touch switch SW-tp6. Then the display signal $D_{signal}$ is input to a touch line which is selected to be connected to.

In the case that the first switch SW-d61 is turned on, the display signal $D_{signal}$ is input to the data line SRC61. In the case that the first switch SW-d62 is turned on, the display signal $D_{signal}$ is input to the data line SRC62. And in the case that the first switch SW-d63 is turned on, the display signal $D_{signal}$ is input to the data line SRC63.

When the touch display panel is in a touch detection period, the first switches SW-d61 to SW-d63 are controlled to be turned off, and the touch switch SW-tp6 is controlled to be turned on, thereby forming a circuit during the touch detection period of the touch display panel.

A touch detection signal $T_{signal}$ output from the touch signal source 62 is transmitted through the touch signal output line 6-2 to the first signal input terminals of the first switches SW-d61 to SW-d63 electronically connected to each other and is transmitted to the signal input terminal of the touch switches SW-tp61 to SW-tp63. Because the first switches SW-d61 to SW-d63 are turned off and the touch switches SW-tp61 and SW-tp62 is turned on, the touch detection signal $T_{signal}$ can be transmitted to the touch lines through the touch switches SW-tp61 and SW-tp62, and thereby is transmitted to the touch electrode. In this way, a touch detection may be performed on the touch display panel.

In the touch display panel shown in FIG. 6, the first signal input terminals of the first switches SW-d61 and SW-d62 are electronically connected to each other, the first signal source 61 can output a first signal to the first signal input terminals of the first switches SW-d61 and SW-d62 through a same lead pin and a same signal output line, and then the first signal cam be transmitted to a data line selected to be connected to. Hence, the number of the lead pins and the number of the signal output lines are reduced by the touch display panel shown in FIG. 6.

Further, in a preferred embodiment of the disclosure, preferably, first signal input terminals of all first switches are electronically connected to each other and are connected to the first signal source 61. The touch display panel with above structure can further reduce the number of the lead pins and the number of the signal output lines.

It should be noted that the first signal source 61 and the touch signal source 62 in the touch display panel shown in FIG. 6 are different signal sources. The display signal and the touch detection signal can only be transmitted to the data lines and the touch lines through different lead pins and signal output lines. In order to further reduce the number of the lead pins and the number of the signal output lines, it is also provided a fourth structure of the touch display panel according to an embodiment of the disclosure.

Figure 7:
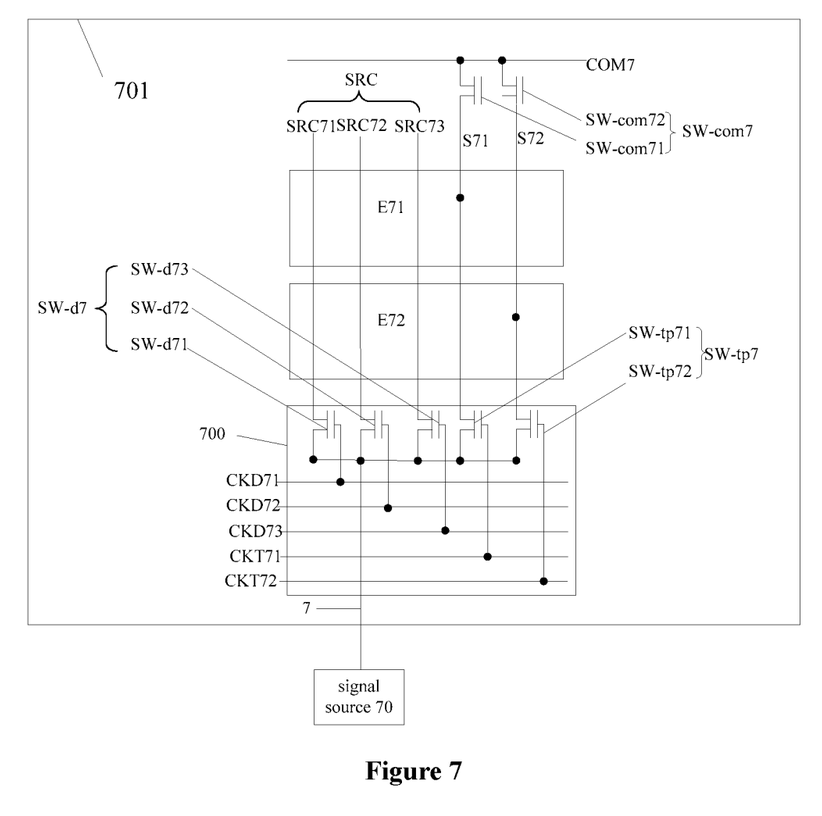
FIG. 7 is a schematic diagram of a fourth structure of the touch display panel according to an embodiment of the disclosure.

FIG. 7 is a schematic diagram of a fourth structure of the touch display panel according to an embodiment of the disclosure. It should be noted that the touch display panel shown in FIG. 7 is similar to the touch display panel shown in FIG. 6. For the sake of brevity, only the difference between the touch display panel shown in FIG. 7 and the touch display panel shown in FIG. 6 is described, and reference is made to the description of FIG. 6 for the similarities between the touch display panel shown in FIG. 7 and the touch display panel shown in FIG. 6.

As shown in FIG. 7, a signal source 70 may provide both a display signal and a touch detection signal. Two types of signals may be provided for the touch display panel through one signal source 70 and one signal output line.

In order to enable the display signal and the touch detection signal to be transmitted to the touch display panel through one lead pin and one signal output line 7, in the touch display panel shown in FIG. 7, first signal input terminals of all first switches and signal input terminals of all touch switches are electronically connected to each other and are connected to the signal source 70.

In addition, the touch display panel shown in FIG. 7 further includes a common electrode line COM7, a common electrode switch SW-com71 is disposed between a touch line S71 and the common electrode line COM7, and a common electrode switch SW-com72 is disposed between a touch line S72 and the common electrode line COM7.

In this way, the display signal and the touch detection signal output from the signal source 70 are transmitted to the signal input terminals of all the first switches and the signal input terminals of all the touch switches. Then the transmitted display signal and touch detection signal are input to path which is selected to be connected to.

It should be noted that the touch electrode is reused as the common electrode in the touch display panel shown in FIG. 7. When the touch display panel is in a display period, a touch switch SW-tp7 is controlled to be turned off, the common electrode switches SW-com71 and SW-com72 are controlled to be turned on, and a first clock pulse signal controls the first switch to be turned on. In this way, a display signal $D_{signal}$ output from the signal source 70 is transmitted through the signal output line 7 to the first signal input terminals of the first switches SW-d71 to SW-d73. Then the display signal $D_{signal}$ is input to a path which is selected to be connected to.

When the touch display panel is in a touch detection period, the first switches SW-d71 to SW-d73 and the common electrode switch SW-com7 are controlled to be turned off, and the touch switch SW-tp7 is controlled to be turned on, thereby forming a circuit during the touch detection period of the touch display panel. A touch detection signal $T_{signal}$ output from the signal source 70 is transmitted to a signal input terminal of the touch switch SW-tp7 through the signal output line 7. Because the first switches SW-d71 to SW-d73 and the common electrode switch SW-com7 are turned off and the touch switch SW-tp7 is turned on, the touch detection signal $T_{signal}$ can be transmitted to the touch line through the touch switch SW-tp7, and thereby is transmitted to the touch electrode. In this way, a touch detection may be performed on the touch display panel.

It should be noted that in the touch display panels shown in FIG. 6 and FIG. 7, the data line may be reused as the touch line, the plurality of first switches may be reused as the touch switches, the first signal source may be reused as the touch signal source, and the plurality of first clock signal lines may be reused as the touch clock signal lines.

In addition, the touch display panel further includes multiple gate lines for inputting a gate driving signal from a gate driving signal source. A signal output line and a lead pin are necessarily to be disposed between each gate line and the gate driving signal source. In order to reduce the number of the signal output lines and the number of the lead pins between the gate lines and the gate driving signal source, the gate lines may be electronically connected to a multipath gating circuit. A fifth structure of the touch display panel according to an embodiment of the disclosure may be referred to for details.

The structure of the touch display panel where the gate lines are electronically connected to the multipath gating circuit is substantially the same as the structure of the touch display panel shown in FIG. 6 or FIG. 7 where the data lines are electronically connected to the multipath gating circuit. The difference lies in that the first switch is replaced by a second switch, the first signal source 61 is replaced by a second signal source for providing the gate driving signal. The structure of the touch display panel where the gate lines are electronically connected to the multipath gating circuit is shown in FIG. 8 and FIG. 9.

Figure 8:
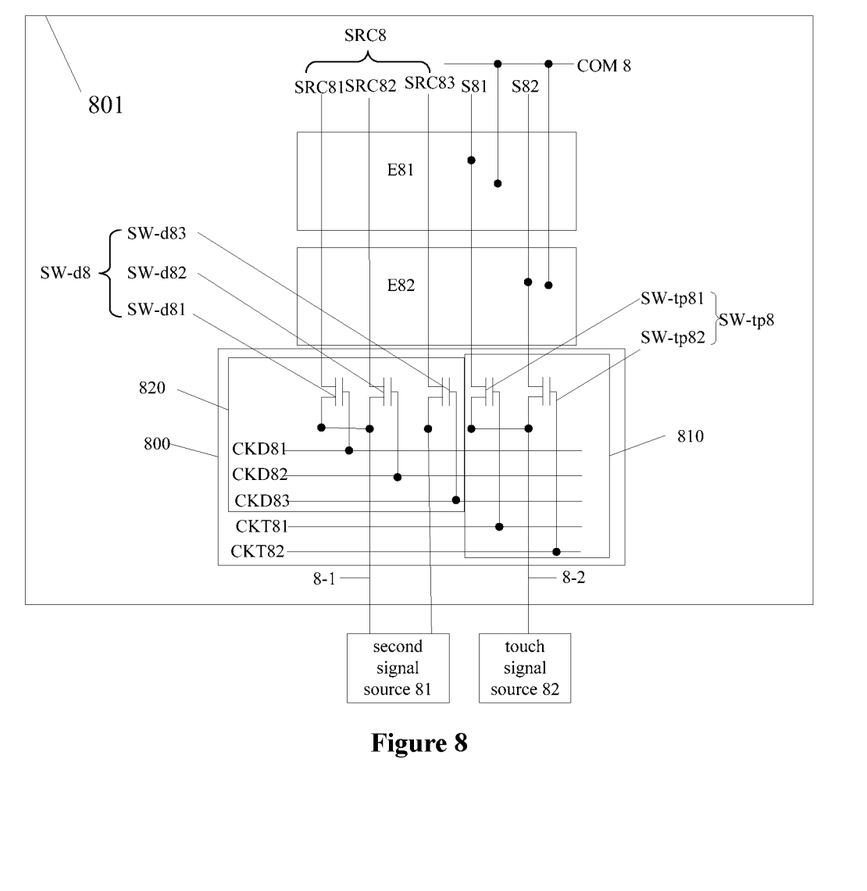
FIG. 8 is a schematic diagram of a fifth structure of the touch display panel according to an embodiment of the disclosure.
Figure 9:
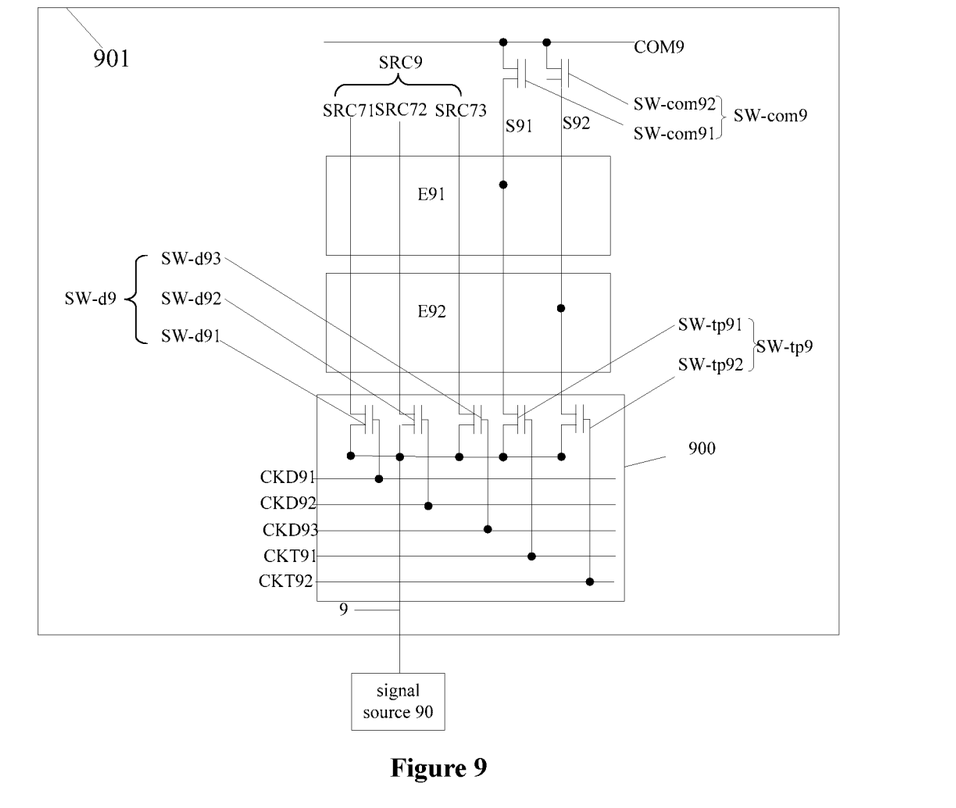
FIG. 9 is a schematic diagram of a sixth structure of the touch display panel according to an embodiment of the disclosure.

As shown in FIG. 8, the touch display panel includes a substrate 801, where a touch electrode layer and two touch lines S81 and S82 are disposed on the substrate 801. The touch electrode layer includes two touch electrodes E81 and E82 insulated from each other, and each of the touch electrodes is electronically connected to a first terminal of a touch line corresponding to the touch electrode. The touch electrode E81 is connected to the touch line S81, and the touch electrode E82 is connected to the touch line S82. The touch display panel shown in FIG. 8 further includes a common electrode line COM8 and multiple data lines SRC8. The common electrode line COM8 is connected to each of the touch electrodes for providing a common voltage signal to each of the touch electrodes.

In addition, the touch display panel further includes a multipath gating circuit 800. The multipath gating circuit 800 includes a first multipath gating circuit 810 and a second multipath gating circuit 820. The first multipath gating circuit 810 includes:

two touch switches SW81 and SW82, and two touch clock signal lines CKT81 and CKT82.

Each of the touch switches includes a control terminal, a signal input terminal and a signal output terminal. The signal output terminal of the touch switch is connected to a second terminal of the touch line corresponding to the touch switch. The signal input terminals of the touch switches SW81 and SW82 are electronically connected to each other and are connected to a touch signal source 82. The control terminal of each touch switch is connected to the touch clock signal lines CKT81 or CKT82 corresponding to the touch switch.

The second multipath gating circuit 820 includes:

three second switches SW-d81 to SW-d83, and three second clock signal line CKD81 to CKD83.

Each of the second switches includes a second control terminal, a second signal input terminal and a second signal output terminal.

The second signal output terminal of the second switch SW-d81 is connected to a data line SRC81, the second signal output terminal of the second switch SW-d82 is connected to a data line SRC82, and the second signal output terminal of the second switch SW-d83 is connected to a data line SRC83.

The common electrode line COM8 is connected to the touch electrode E81 and the touch electrode E82.

The second signal input terminals of the second switches SW-d81 and SW-d82 are electronically connected to each other and are electronically connected to a first signal source 81 through a second signal output line 8-1. The second signal input terminal of the second switch SW-d83 is connected to a second signal source 81 through another second signal output line 8-1.

The second control terminal of the second switch SW-d81 is connected to the second clock signal line CKD81, the second control terminal of the second switch SW-d82 is connected to the second clock signal line CKD82, and the second control terminal of the second switch SW-d83 is connected to the second clock signal line CKD83.

It should be noted that the second signal source 81 and the touch signal source 82 in the touch display panel shown in FIG. 8 are different signal sources. The gate driving signal and the touch detection signal can be transmitted to the data lines and the touch lines through different lead pins and signal output lines. In order to further reduce the number of the lead pins and the number of the signal output lines, it is also provided a sixth structure of the touch display panel according to an embodiment of the disclosure, as is described in detail in FIG. 9.

FIG. 9 is a schematic diagram of the sixth structure of the touch display panel according to the embodiment of the disclosure. It should be noted that the touch display panel shown in FIG. 9 is similar to the touch display panel shown in FIG. 8. For the sake of brevity, only the difference between the touch display panel shown in FIG. 9 and the touch display panel shown in FIG. 8 is described, and reference is made to the description of FIG. 8 for the similarities between the touch display panel shown in FIG. 9 and the touch display panel shown in FIG. 8.

As shown in FIG. 9, a signal source 90 may provide both a gate driving signal and a touch detection signal. Two types of signals may be provided to the touch display panel by the signal source 90 and one signal output line.

In order to achieve the effect that the gate driving signal and the touch detection signal can be transmitted to the touch display panel through one lead pin and one signal output line 9, in the touch display panel shown in FIG. 9, second signal input terminals of all the second switches and signal input terminals of all the touch switches are electronically connected to each other and are connected to the signal source 90.

In addition, the touch display panel shown in FIG. 9 further includes a common electrode line COM9, a common electrode switch SW-com91 is disposed between a touch line S91 and the common electrode line COM9, and a common electrode switch SW-com92 is disposed between a touch line S92 and the common electrode line COM9.

It should be noted that in the touch display panels shown in FIG. 8 and FIG. 9, the gate line may be reused as the touch line, the plurality of second switches are reused as the touch switches, the second signal source is reused as the touch signal source, and the plurality of second clock signal lines are reused as the touch clock signal lines.

The driving method for the touch display panel with the sixth structure is substantially same to the driving method for the touch display panel with the third structure or the fourth structure, and is not described herein, for sake of brevity. Reference is made to the description of FIG. 6 or FIG. 7 for details of the driving method for the touch display panel.

Figure 10:
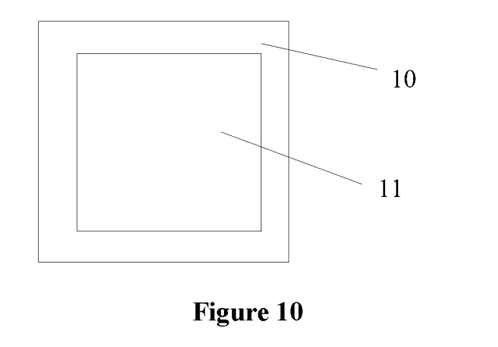
FIG. 10 is a schematic structural diagram of a display device according to an embodiment of the disclosure.

It is also provided a display device according to the disclosure based on the above touch display panel. As shown in FIG. 10, the display device 10 includes a touch display panel 11 with any one of the above structures.

The above descriptions of the disclosed embodiments enable those skilled in the art to implement or use the present disclosure. Various modifications made to those embodiments will be obvious to those skilled in the art, and the general principles defined in the present disclosure can be implemented in other embodiments without departing from the spirit or the scope of the present disclosure. In this way, the present invention should not be limited to these embodiments disclosed herein, but should be the widest scope in accordance with the principles and the novel characteristics disclosed by the present invention.

The invention claimed is:

1. A touch display panel, comprising:
   a substrate; and
   a signal source, configured to provide both a display signal and a touch detection signal, wherein the signal source is separated from the substrate,
   wherein the substrate comprises:
      a plurality of touch lines,
      a plurality of touch electrodes insulated from each other, wherein each of the touch electrodes is electronically connected to a corresponding touch line,
      a plurality of data lines,
      a multipath gating circuit, comprising:
         a plurality of first switches, each comprising a first control terminal, a first signal input terminal, and a first signal output terminal, wherein the first signal output terminal is connected to a corresponding data line,
         a plurality of first clock signal lines, each connected to the first control terminal of one of the first switches,
         a plurality of touch switches, each connected to a different one of the touch lines,
         a plurality of touch clock signal lines, each connected to one of the touch switches, and
         a single signal conductor connected to each of the first switches and each of the touch switches, and
         a single lead pin directly connected to the single signal conductor,
      a common electrode line, and
      a plurality of common electrode switches each comprising a common voltage input terminal connected to the common electrode line, a common voltage output terminal, and a common electrode control terminal,
   wherein each of the touch switches comprises:
      a touch control terminal,
      a signal input terminal, and
      a signal output terminal,
      wherein the signal output terminal is connected to a first end of a corresponding touch line, and is electrically connected, via the corresponding touch line, to the common voltage output terminal of a corresponding common electrode switch at a second end of the corresponding touch line, and wherein the touch control terminal is connected to one of the touch clock signal lines,
      wherein each of the signal input terminals of the touch switches is electrically connected to one of the first signal input terminals of the first switches, and is electrically connected to the single signal conductor, and
   wherein the signal source is directly connected to the single lead pin, and is configured to:
      provide the display signal to the single lead pin while the common electrode switch is on and the touch switches are off, and
      provide, via the single lead pin, the touch detection signal to the touch electrodes while the common electrode switch is off and the touch switches are on.

2. The touch display panel according to claim 1, further comprising a plurality of gate lines electronically connected to the multipath gating circuit.

3. The touch display panel according to claim 2, wherein the multipath gating circuit further comprises a plurality of second switches, a second signal source and a plurality of second clock signal lines, wherein each of the second switches comprises a second control terminal, a second signal input terminal and a second signal output terminal,
   wherein the second signal output terminal of each of the second switches is connected to a data line corresponding to the second switch, second signal input terminals of at least two of the second switches are electronically connected to each other and are connected to the second signal source, and the second control terminal of each of the second switches is electronically connected to the second clock signal line corresponding to the second switch.

4. The touch display panel according to claim 3, wherein the second signal input terminals of all the second switches are electronically connected to each other.

5. The touch display panel according to claim 1, wherein the data line is reused as the touch line, the plurality of first switches are reused as the touch switches, and the plurality of first clock signal lines are reused as the touch clock signal lines.

6. A display device comprising the touch display panel of claim 1.

* * * * *